United States Patent
Chuang et al.

[11] Patent Number: 5,975,503
[45] Date of Patent: Nov. 2, 1999

[54] STRUCTURED PACKING ASSEMBLY

[75] Inventors: Karl Tze-Tang Chuang; Douglas Alexander Lillico, both of Edmonton; Varagur S. V. Rajan, Sherwood Park, all of Canada

[73] Assignees: Alberta Research Council; Karl Tze-Tang, both of Edmonton, Canada

[21] Appl. No.: 09/244,208

[22] Filed: Feb. 4, 1999

[30] Foreign Application Priority Data

Dec. 23, 1998 [CA] Canada ................................. 2257128

[51] Int. Cl.⁶ ....................................................... B01F 3/04
[52] U.S. Cl. ................ 261/112.1; 261/113; 261/DIG. 72
[58] Field of Search ............................... 261/94, 95, 108, 261/112.1, 113, DIG. 72

[56] References Cited

U.S. PATENT DOCUMENTS

| | | | |
|---|---|---|---|
| 1,561,044 | 11/1925 | Alexander | 261/108 |
| 2,042,127 | 5/1936 | Sayles | 261/112 |
| 3,235,234 | 2/1966 | Beaudoin | 261/95 |
| 3,463,222 | 8/1969 | Grames | 261/112.1 |
| 3,739,556 | 6/1973 | Waters | 261/112.1 |
| 4,296,050 | 10/1981 | Meier | 261/112 |
| 4,337,217 | 6/1982 | Braun | 261/112.1 |
| 4,676,934 | 6/1987 | Seah | 261/112 |
| 4,842,778 | 6/1989 | Chen et al. | 261/97 |
| 4,929,399 | 5/1990 | Lockett et al. | 261/112.2 |
| 4,981,621 | 1/1991 | Pluss | 261/112.2 |
| 5,057,250 | 10/1991 | Chen et al. | 263/112.2 |
| 5,063,000 | 11/1991 | Mix | 261/94 |
| 5,080,836 | 1/1992 | Chen et al. | 261/112.2 |
| 5,132,056 | 7/1992 | Lockett et al. | 261/112.2 |
| 5,185,106 | 2/1993 | Chen et al. | 261/112.2 |
| 5,188,773 | 2/1993 | Chen et al. | 261/112.2 |
| 5,407,607 | 4/1995 | Mix | 261/112.2 |
| 5,413,741 | 5/1995 | Buchholz et al. | 261/112.2 |
| 5,441,793 | 8/1995 | Suess | 428/192 |
| 5,458,817 | 10/1995 | Lang | 261/94 |
| 5,500,160 | 3/1996 | Suess | 261/79.2 |
| 5,578,254 | 11/1996 | Mix | 261/112.2 |
| 5,624,733 | 4/1997 | McKeigue et al. | 428/182 |
| 5,637,263 | 6/1997 | Lang et al. | 261/94 |
| 5,644,932 | 7/1997 | Dunbobbin et al. | 62/640 |
| 5,653,126 | 8/1997 | Harada et al. | 62/643 |

FOREIGN PATENT DOCUMENTS

| | | | |
|---|---|---|---|
| 1292424 | 11/1991 | Canada . | |
| 1327306 | 3/1994 | Canada . | |
| 814419 | 3/1981 | U.S.S.R. | 261/108 |
| 1291191 | 2/1987 | U.S.S.R. | 261/DIG. 72 |
| 1409315 | 7/1988 | U.S.S.R. | 261/DIG. 72 |
| 1685503 A1 | 10/1991 | U.S.S.R. | 261/DIG. 72 |
| 1402883 | 8/1975 | United Kingdom | 261/DIG. 72 |

*Primary Examiner*—C. Scott Bushey
*Attorney, Agent, or Firm*—Neil Teitelbaum & Associates

[57] ABSTRACT

Structured packing for mass-exchange or energy-exchange processes uses a stack of parallel, flat sheets forming flat channels therebetween. A number of tabs extends between adjacent pairs of sheets to form both bridges for fluid flow and spacers for structural rigidity of the packing. Some of the tabs serve predominantly to divert fluid over the entire surface of a given sheet to prevent so-called channeling, while other tabs are disposed to predominantly enhance fluid transfer between the adjacent sheets. Fluid communication between both sides of each sheet is facilitated due to perforations caused by the manufacturing of the tabs. The design allows for the use of very thin sheets resulting in a light-weight packing assembly.

7 Claims, 1 Drawing Sheet

STRUCTURED PACKING ASSEMBLY

BACKGROUND OF THE INVENTION

The invention relates to a structured packing for producing intimate contact of fluids, for example liquid-liquid, liquid-gas, or gas-gas, particularly in a mass and/or heat exchange apparatus. More particularly, the invention relates to a structured packing assembly for enhancing contact between a first fluid having a predominantly downward direction of flow, and a second fluid, the packing having a plurality of juxtaposed sheets.

Structured packings in general have a well-defined geometry of discrete flow channels facilitating theoretical estimation of the performance of the transfer device. Structured packings of various designs have been known in the chemical industry for decades. They are generally known to offer a lower resistance to flow than bulk (random) packing, and lend themselves to easy installation within a mass exchange chamber. Structured packing elements may be constructed of corrugated of fluted plates, such as known e.g., from U.S. Pat. Nos. 4,929,399 to Lockett et al.; 5,407,607 to Mix; 5,188,773 to Chen et al; 5,624,733 to McKeigue et al. and 5,132,056 to Lockett et al.

In most of the prior art solutions, the corrugations, folds or flutings are arranged at an angle to the vertical, or the axis of the column or tower. This has the effect of non-uniform distribution of the liquid flow over the surface of the packing plates.

U.S. Pat. No. 2,042,127 to Sayles describes a structured packing assembly composed of a number of generally vertically disposed, parallel, generally flat sheets arranged in superimposed tiers. The assembly features collectors disposed at the top of a tier for distribution of down-flowing liquid over both sides of the subjacent plates. It is noted that Sayles advocates the sheets being disposed as close as possible to prevent cascading, or free-fall of liquid through the packing.

While the parallel-sheet concept of Sayles is useful, there is still a need in the mass/energy transfer industry for a simple, low weight (low material cost) structured packing and a large surface area (high efficiency interphase transfer) with a relatively low pressure drop. It is also very important that vapour and liquid be able to transfer between sheets so that uniform liquid and vapour distribution over the column or tower cross-section be maintained. The uniform distribution of fluids is essential for achieving high efficiency of mass transfer. The ease of assembly and placement in the exchange apparatus (e.g., a tower) as well as the structural quality of the packing are also of importance.

SUMMARY OF THE INVENTION

In accordance with the invention, there is provided a packing assembly for enhancing contact of fluids passing therethrough, the packing assembly comprising:

- a plurality of juxtaposed generally flat sheets disposed generally parallel to each other to form generally flat channels for the flow of the fluids therethrough,
- at least some of said sheets comprising a plurality of projections disposed in said channels and extending between adjacent sheets in a bridging relationship.

Preferably, the contact between said projections and the adjacent sheets is by abutment only, but a permanent attachment is also feasible.

The packing assembly may further comprise a plurality of perforations in at least some of said sheets to provide fluid communication between both sides of said at least some sheets.

Preferably, the projections are formed as integral part of said sheets and are disposed in a regular arrangement over the surface of said sheets such as to promote uniform distribution of at least one of the fluids passing through the assembly over the surface of the sheet.

In a preferred embodiment of the invention, the protrusions may take the form of punched-out tabs, each sheet having at least one such tab that extends from the sheet at an angle such as to enable a descending liquid flowing as a film over the surface of the sheet to flow over the tab toward the adjacent sheet and onto the surface of the adjacent sheet. The perforation left by the punching of the tab serves to enable the flow of a liquid phase or of a gaseous or vapour phase from one side of the sheet to another side thereof.

BRIEF DESCRIPTION OF THE DRAWINGS

The invention will be explained in more detail by way of the following description in conjunction with the accompanying drawings in which.

DETAILED DESCRIPTION OF THE INVENTION

Figure 1:
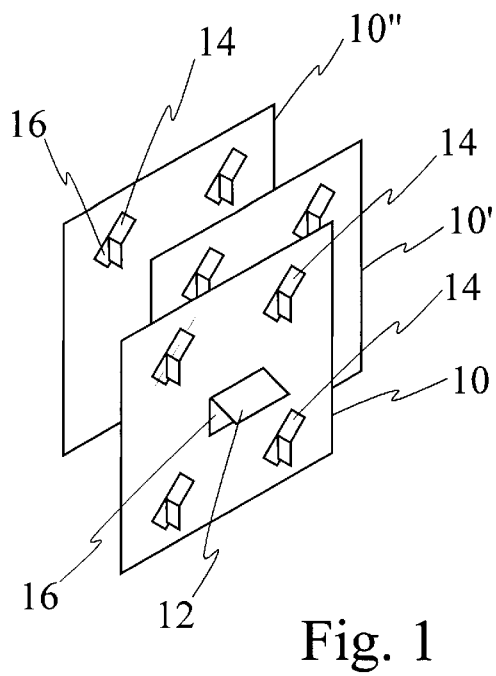
FIG. 1 is a perspective exploded view of the packing assembly of the invention.

In a preferred embodiment of the structured packing assembly of the invention, the assembly is constructed of several flat sheets 10, 10', 10", each sheet having a central spreader tab 12 and four spacer tabs 14. Both types of tabs are provided by punching out parts of the sheets without cut-aways. The punched-out tabs 12 and 14 define perforations 16.

Figure 3:
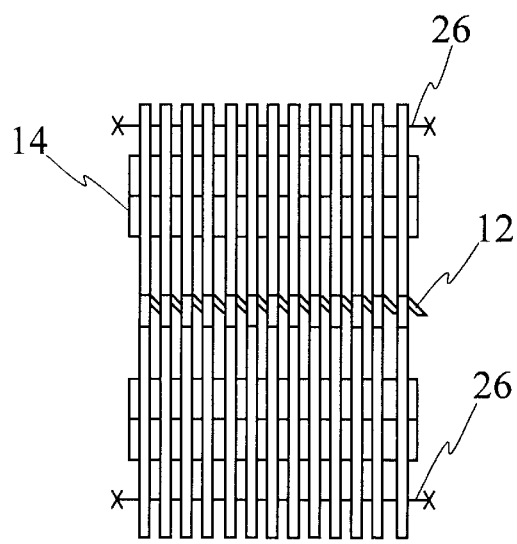
FIG. 3 represents a side view of the assembly.

The central tab 12 on each sheet is of a quadrilateral, e.g., rectangular shape. It is preferable that the outer edge 22 of the tab 12 be essentially parallel to the respective sheet 10 such that, when assembled, the outer edge 22 is close to the adjacent sheet with its entire length to facilitate the transfer of descending fluid between the sheets by creating a wider "bridge" between the respective sheets. The tab 12 is preferably cut out horizontally (perpendicularly to the direction of flow of the descending fluid) and projecting from the plane of the sheet 10 at an angle of about 45° relative to the horizontal, as best seen in FIG. 3, so that some of the fluid flowing downward over the surface of the sheet 10 will be deflected over the surface of the tab 12 onto the surface of the adjacent sheet. This feature is designed to distribute the flow of at least the descending fluid between the sheets. The height of the slot and the angle of protrusion of the spreader tab 12 is such that the tab is confined to a width less than the gap between the sheets controlled by the spacer tabs 14.

Turning now to the spacer tabs 14, the major axes of these tabs, indicated in dotted lines, are disposed diagonally relative to the vertical and to the downward direction of flow of the first fluid, and folded out of the plane of the sheet 10 at about a straight angle. In the embodiment illustrated in FIG. 2, the tabs 14 are also partly bent at an angle of about 120° to control the lateral spread of the descending fluid.

The size of each tab 14 is selected such that, in the assembled packing, the tabs 14, in addition to their above-described purpose, also bridge adjacent sheets 10, 10' and act as spacers. The tabs 14 also serve to spread the descending fluid sidewise over the surface of the same sheet to enhance uniform distribution of fluid over the entire surface of the sheets. Practically, the spacer tabs 14 will likely also function to allow passage of the fluids between adjacent sheets while the spreader tabs 12 will likely function partially to distribute the fluid flow laterally, over the surface of the adjacent sheet facing the protrusion. In other words, while the tabs are intended for separate (but mutually complementary) purposes, viz., 1) transfer of fluids between sheets and 2) relatively uniform distribution of fluids over the surface of each sheet, they will likely perform, to a degree, both functions.

Figure 2:
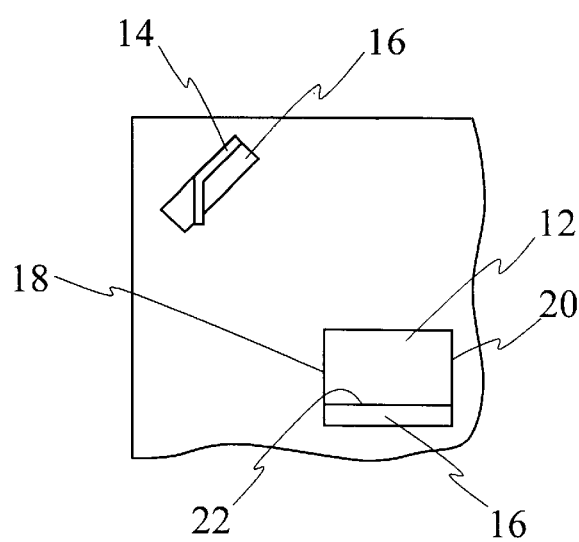
FIG. 2 is a partial front view of a single sheet of the packing assembly.

It will be noted that the tabs 14 in the embodiment illustrated in FIG. 2 are inclined in only one direction and partly bent to expose a part of the opening 16 which is formed by punching out the tab 14. The thus exposed part of the opening 16 facilitates a transfer of both fluids from one side of the respective sheet onto another.

Figure 4:
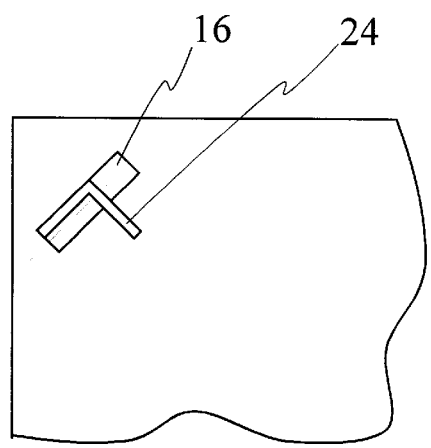
FIG. 4 is a partial front view of a single sheet of an alternative embodiment of the packing assembly.

It is feasible to provide the spacer tabs 14 of a different shape, i.e., as illustrated in FIG. 4, wherein the spreader tabs 24 are bent to form a symmetrical semi-triangular outline. Such a shape would have the effect of spreading the descending fluid uniformly on both sides of the tab 24. It should be noted that the corrugated sheets of the prior art are assembled with the flow channels at an angle of 30–45° to the vertical direction. As a result, the entire gas flow upward changes direction as the gas passes from one channel to the one above it in the next staggered layer. This causes higher pressure drop than that for the flat sheet packing of the present invention. The pressure drop over the flat sheets will increase somewhat with the presence of the tabs. However, this increase would be small because the tabs obstruct only a small fraction of the flow area deflecting a small portion of the total gas flow, and the deflection angle can be selected to minimize the pressure drop. Generally, the size, shape and orientation of the tabs can be designed to meet fluid distribution and pressure drop requirements.

It will be seen in FIG. 3 that the sheets are maintained in the parallel arrangement by the tabs 14 acting as spacers. It is feasible to provide a greater plurality of tabs 12 and 14 and arrange for only some tabs 14 to extend from one sheet to another while the remaining tabs 14 also serve to deflect the flow of descending fluid laterally but do not abut the opposite sheet. This provision may be applied to control the flow resistance, or pressure drop, of the fluids. The spacer tabs 14 also provide strength or mechanical rigidity to the sheet assembly. Consequently, the sheets can be of relatively small thickness compared with conventional structures, resulting in a lower weight and reduced material use of the structured packing.

Referring again to FIG. 1, it will be noted that the juxtaposed sheets 10 are disposed in a staggered arrangement of their respective tabs 12 and 14. The reason for such an arrangement will become clear once it is realized that in a mass-production, all the sheets will be manufactured with an identical pattern of the tabs 12, 14 and corresponding openings 16. During assembly, the tabs of one sheet would tend to fall into the corresponding openings of the adjacent sheet unless an amount of lateral shift, or stagger, were applied. The orderly arrangement of the tabs ensures uniform distribution of the fluids over the sheets.

The assembled packing structure may be maintained in a fixed shape by various conventional means. They may include tie-rods 26 extending through a set of sheets as shown schematically in FIG. 3, or external straps or frame (not shown) or other known fastening elements. In any case, the assembly does not require means for interlocking the sheets of one tier with the sheets of another (upper or lower) tier for positioning and structural rigidity as in Sayles U.S. Pat. No. 2,042,127. An assembly of the invention may simply be stacked on top of another assembly, turned by 90° to avoid the intercalation of the respective sheets.

The size of the sheets and of the tabs may vary depending on the dimensions of the process apparatus and process conditions. Additional surface treatment of the sheets, e.g., coating, roughness or small weep holes, may be applied to achieve desired performance characteristics.

It is a feature of the invention that the protrusions extending between adjacent sheets function both as bridges creating a flow path of the film of descending liquid between adjacent sheets and as stiffeners enhancing the structural stability of the assembly.

It is an advantage of the invention that the beneficial effect of louvers, perforations/openings and protrusions of the prior art is combined with the simplicity and relatively low pressure drop characteristic of the flat sheet structured packing wherein the protrusions perform a double function, i.e., distribution of fluid flow and enhancement of the rigidity of the assembly.

What is claimed is:

1. A structured packing assembly for enhancing contact of a first fluid and a second fluid, said first fluid having a generally downward direction of flow when passing through said packing assembly, the packing assembly comprising a plurality of juxtaposed generally flat sheets disposed generally parallel to each other to form generally flat channels for the flow of said fluids therethrough, and a plurality of projections arranged in each of said channels, wherein said projections comprise at least one fluid-spreading projection and a plurality of spacing projections, the at least one fluid-spreading projection extending angularly downwards from one sheet towards an adjacent sheet without contacting said adjacent sheet such as to divert said first fluid flowing along said one sheet towards said adjacent sheet, the spacing projections extending between adjacent sheets in a bridging relationship at a generally straight angle to the sheets and at an angle to the horizontal to minimize hold-up or entrapment of said first fluid thereby.

2. The structured packing assembly of claim 1 further comprising a plurality of perforations in said sheets to provide fluid communication between both sides of said sheets, said perforations defined by said projections.

3. The assembly according to claim 1 wherein the projections are formed as integral parts of said sheets and are disposed in a regular arrangement over the surface of said sheets to achieve relatively uniform distribution of at least one of the fluids passing through the assembly over the surfaces of the sheets.

4. The assembly according to claim 1 wherein said sheets are disposed in a laterally staggered arrangement.

5. The assembly according to claim 1 wherein said spacing projections have two segments bent relative to each other, both segments disposed at a straight angle relative to the sheets.

6. The assembly according to claim 5 wherein one of said two segments is disposed vertically and the second segment is disposed at an angle to the vertical to facilitate one-sided lateral deflection of said first fluid flowing down said sheets.

7. The assembly according to claim 5 wherein both segments are disposed at an angle to the vertical to facilitate two-sided lateral spread of said first fluid flowing down said sheets.

\* \* \* \* \*